United States Patent
Oka et al.

(10) Patent No.: US 11,554,809 B2
(45) Date of Patent: Jan. 17, 2023

(54) STEERING ANGLE DETECTION DEVICE AND ELECTRIC POWER STEERING DEVICE USING SAME

(71) Applicant: DENSO CORPORATION, Kariya (JP)

(72) Inventors: Atsuko Oka, Kariya (JP); Shuji Kuramitsu, Kariya (JP); Koichi Nakamura, Kariya (JP); Yuki Watanabe, Kariya (JP); Toshihiro Fujita, Kariya (JP); Takaharu Kozawa, Kariya (JP); Shuhei Miyachi, Kariya (JP); Katsuhiko Hayashi, Kariya (JP); Masaya Taki, Kariya (JP); Toshimitsu Sakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 591 days.

(21) Appl. No.: 16/654,307

(22) Filed: Oct. 16, 2019

(65) Prior Publication Data

US 2020/0047805 A1 Feb. 13, 2020

Related U.S. Application Data

(63) Continuation of application No. PCT/JP2018/015711, filed on Apr. 16, 2018.

(30) Foreign Application Priority Data

Apr. 18, 2017 (JP) ................. 2017-082311

(51) Int. Cl.
*B62D 15/02* (2006.01)
*B60R 16/027* (2006.01)
*B62D 5/04* (2006.01)

(52) U.S. Cl.
CPC ........ *B62D 15/0235* (2013.01); *B60R 16/027* (2013.01); *B62D 5/0463* (2013.01)

(58) Field of Classification Search
CPC .............. B62D 15/0235; B62D 5/0463; B62D 5/0484; B60R 16/027; G01B 21/22
See application file for complete search history.

(56) References Cited

U.S. PATENT DOCUMENTS 6,131,538 A * 10/2000 Kanai ................... B60K 6/445
 73/114.61
2003/0200018 A1* 10/2003 Arimura .............. B62D 5/0457
 180/443

(Continued)

FOREIGN PATENT DOCUMENTS

JP H9-16427 A 1/1997
JP 2006-237832 A 9/2006

(Continued)

*Primary Examiner* — Thomas Ingram
(74) *Attorney, Agent, or Firm* — Maschoff Brennan

(57) ABSTRACT

A steering angle detection device includes plural control units and plural steering angle sensors. Each control unit is configured to transmit steering angle information related to a steering angle of a vehicle to an external device and transmit and receive information mutually therebetween. Each steering angle sensor is provided in correspondence to each control unit and configured to output a sensor signal corresponding to a detection value of a change in the steering angle to the corresponding control unit. One of the control units transmits, as a transmission control unit, the steering angle information to the external device at one transmission timing.

18 Claims, 8 Drawing Sheets

(56) References Cited

U.S. PATENT DOCUMENTS

| | | | |
|---|---|---|---|
| 2006/0085113 A1* | 4/2006 | Tamaizumi | B62D 5/0463 701/41 |
| 2009/0125187 A1 | 5/2009 | Yamamoto et al. | |
| 2009/0174574 A1 | 7/2009 | Endo et al. | |
| 2009/0189814 A1* | 7/2009 | Moriuchi | G01S 13/931 342/75 |
| 2010/0198473 A1* | 8/2010 | Strengert | B60T 17/221 701/70 |
| 2013/0166138 A1* | 6/2013 | Yun | G07C 5/008 701/32.6 |
| 2014/0052331 A1* | 2/2014 | Jang | B62D 6/10 701/34.4 |
| 2014/0288786 A1* | 9/2014 | Mayser | B60W 50/0205 701/48 |
| 2016/0167701 A1 | 6/2016 | Sone | |
| 2016/0223344 A1* | 8/2016 | Sanami | B60L 3/12 |
| 2016/0280307 A1* | 9/2016 | Takenaka | B62K 5/01 |
| 2018/0151066 A1 | 5/2018 | Oba | |
| 2020/0377147 A1* | 12/2020 | Ishihara | F16H 25/2204 |

FOREIGN PATENT DOCUMENTS

| | | |
|---|---|---|
| JP | 2007-106283 A | 4/2007 |
| JP | 2007-190985 A | 8/2007 |
| JP | 2007-290557 A | 11/2007 |
| JP | 2016-113031 A | 6/2016 |
| JP | 2017-041070 A | 2/2017 |
| JP | 2017-054296 A | 3/2017 |

* cited by examiner

STEERING ANGLE DETECTION DEVICE AND ELECTRIC POWER STEERING DEVICE USING SAME

CROSS REFERENCE TO RELATED APPLICATION

The present application is a continuation application of International Patent Application No. PCT/JP2018/015711 filed on Apr. 16, 2018, which designated the U.S. and claims the benefit of priority from Japanese Patent Application No. 2017-082311 filed on Apr. 18, 2017. The entire disclosures of all of the above-referred applications are incorporated herein by reference.

FIELD

The present disclosure relates to a steering angle detection device and an electric power steering device using the same.

BACKGROUND

Conventionally, a steering device for controlling a steering mechanism that steers steered wheels is known. For example, two steering angle sensors which detect a steering angle are provided in such a steering device.

Detection values of two steering angle sensors are output to a steering control device and a reaction force control device, respectively. In case of a plurality of independent steering angle sensors, errors occur in the detection values due to detection errors of sensor elements, deviations in detection timing and the like.

SUMMARY

A steering angle detection device according to the present disclosure includes at least first and second control units and at least first and second steering angle sensors. Each of the first and second control units transmits steering angle information related to a steering angle of a vehicle to an external device and transmits and receives information mutually therebetween. The first and second steering angle sensors output first and second sensor signals corresponding to first and second detection values of the steering angle to the first and second control units, respectively. One of the first and second control units transmits, as a transmission control unit, the steering angle information to the external device at one transmission timing.

BRIEF DESCRIPTION OF THE DRAWINGS

The above and other objects, features and advantages of the present disclosure will become more apparent from the following detailed description taken in conjunction with the accompanying drawings. In the drawings.

EMBODIMENT

Figure 1:
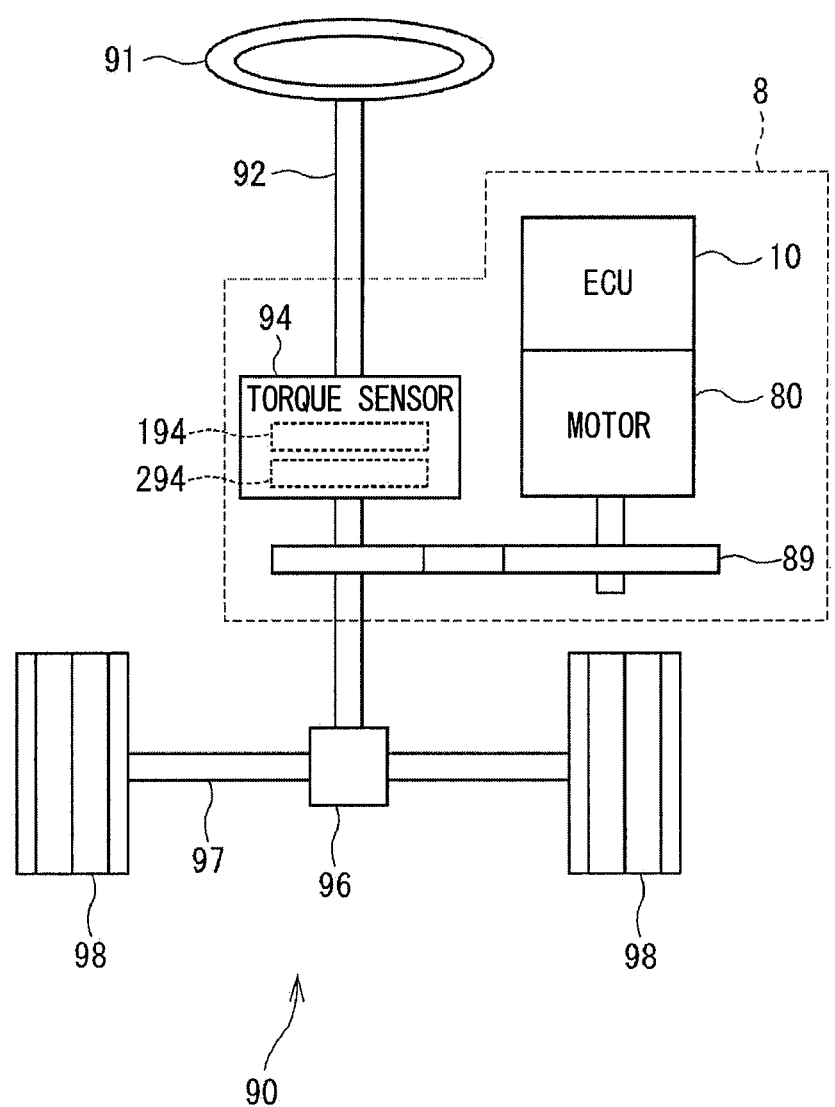
FIG. 1 is a schematic diagram showing a steering system including a steering control device according to a first embodiment.

A steering angle detection device and an electric power steering device using such a steering angle detection device will be described below with reference to the drawings. In the following plural embodiments, substantially same structural configurations are designated with the same reference numerals thereby to simplify the description.

First Embodiment

A steering angle detection device and an electric power steering device using the same according to a first embodiment are shown in FIG. 1 to FIG. 4.

Referring first to FIG. 1, a steering angle detection device 10 is provided as an ECU (electronic control unit). The steering angle detection device 10 is incorporated in an electric power steering device 8 which assists a steering operation of a vehicle. The electric power steering device 8 is provided in a steering system 90. The steering system 90 includes a steering wheel 91, a steering shaft 92, a pinion gear 96, a rack shaft 97, road wheels 98 and the electric power steering device 8. Hereinafter, the electric power steering device 8 is abbreviated as EPS.

Figure 2:
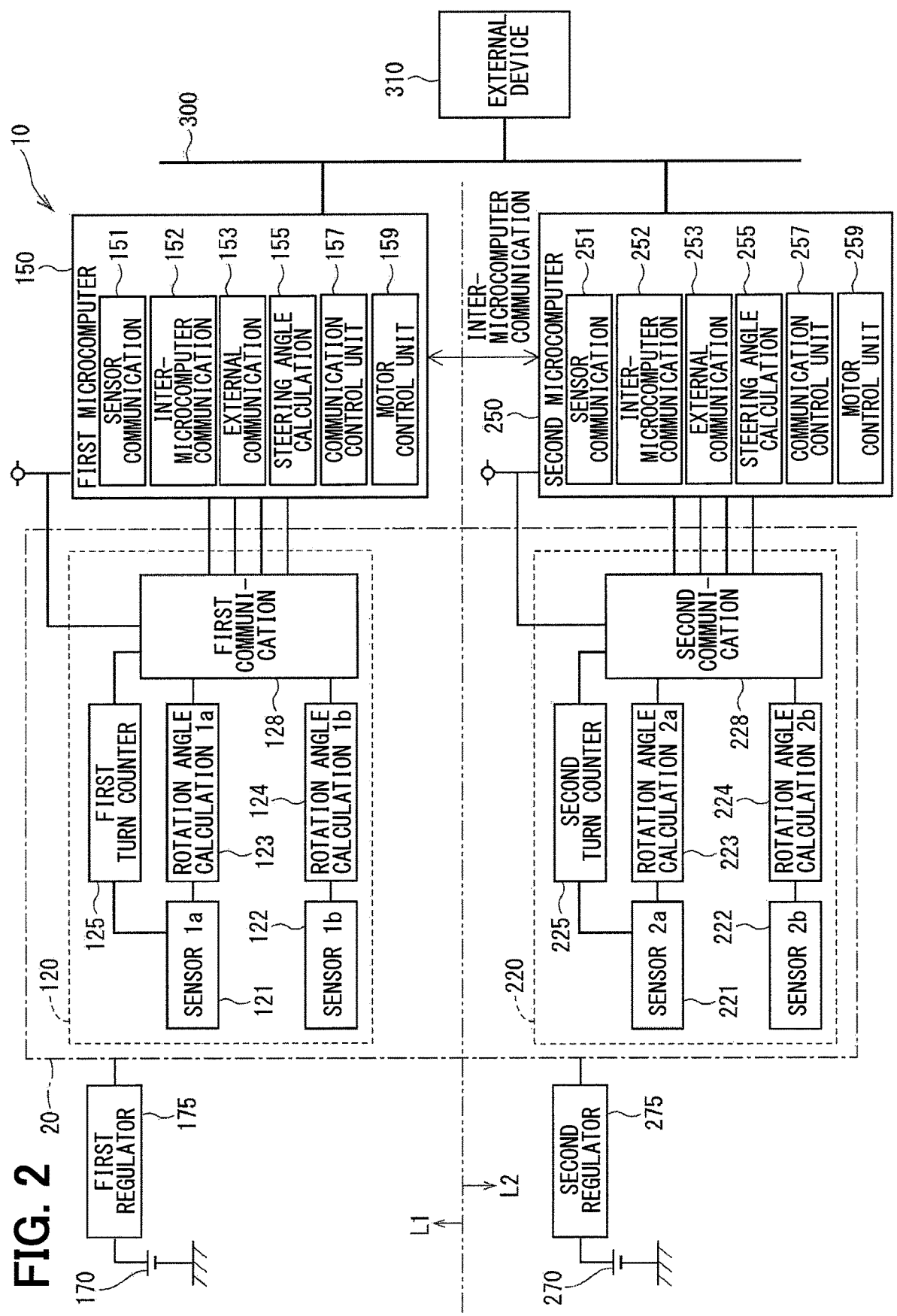
FIG. 2 is a block diagram showing a steering angle detection device according to the first embodiment.

The steering wheel 91 is connected to the steering shaft 92. A torque sensor 94 is provided on the steering shaft 92 to detect a steering torque. The torque sensor 94 has a torsion bar (not shown). The torsion bar coaxially connects an upper side and a lower side of the steering shaft 92. The torque sensor 94 includes a first sensor part 194 and a second sensor part 294. Detection values of the first sensor part 194 and the second sensor part 294 are output to a first control unit 150 and a second control unit 250, which are shown in FIG. 2, respectively.

The pinion gear 96 is provided at an axial end of the steering shaft 92. The pinion gear 96 meshes with the rack shaft 97. A pair of road wheels 98 is coupled at both ends of the rack shaft 97 via, for example, tie rods. When a driver of the vehicle operates the steering wheel 91, the steering shaft 92 connected to the steering wheel 91 rotates. The rotational motion of the steering shaft 92 is converted into a linear motion of the rack shaft 97 by the pinion gear 96. The pair of road wheels 98 is steered to an angle corresponding to the displacement amount of the rack shaft 97.

The electric power steering device 8 includes a reduction gear 89 and the like in addition to the motor 80 and the steering angle detection device 10. The reduction gear 89 is a power transmission mechanism that reduces the rotation of the motor 80 and transmits the rotation to the steering shaft 92. The electric power steering device 8 of the present embodiment is a column assist type. It may alternatively be a rack assist type that transmits the rotation of the motor 80 to the rack shaft 97. In the present embodiment, the steering shaft 92 is a driven object.

The motor 80 outputs assist torque for assisting the steering of the steering wheel 91 operated by a driver. The motor 80 is driven by electric power supplied from batteries 170 and 270 (refer to FIG. 2) which are direct current power supplies to rotate the reduction gear 89 in forward and reverse directions. The motor 80 is a three-phase brushless motor and has a rotor and a stator (both not shown). The batteries 170 and 270 may have equal or different power supply voltages. Further, a converter (not shown) may be provided depending on a voltage.

As shown in FIG. 2, the steering angle detection device 10 includes a sensor unit 20, a first control unit 150, a second control unit 250 and the like. Hereinafter, a combination of the first control unit 150 and a configuration provided in association with the first control unit 150 is referred to as a first system L1. Similarly, a combination of the second control unit 250 and a configuration provided in association with the second control unit 250 is referred to as a second system L2. The configuration related to the first system L1 is basically indicated with reference numerals having 100 and the configuration related to the second system L2 is basically indicated with reference numerals having 200. The lower two digits of the reference numerals of the first system L1 and the second system L2 are the same for the same configuration between the first system L1 and the second system L2. Further, in the drawings, etc., a suffix "1" is attached to numerals of the configuration and value related to the first system L1 and a suffix "2" is attached to numerals of the configuration and value related to the second system L2 as appropriate. If there is no distinction between the systems, the suffixes are not attached.

The sensor unit 20 has a first rotation angle sensor 120 and a second rotation angle sensor 220. The first rotation angle sensor 120 and the second rotation angle sensor 220 function independently of each other. In the present embodiment, the rotation angle sensors 120 and 220 correspond to steering angle sensors. In the present embodiment, the rotation angle sensors 120 and 220 form one sensor unit 20, but may be separately provided. The first rotation angle sensor 120 includes sensor elements 121 and 122, rotation angle calculation units 123 and 124, a first turn counter 125 and a first communication unit 128. The second rotation angle sensor 220 includes sensor elements 221 and 222, rotation angle calculation units 223 and 224, a second turn counter 225 and a second communication unit 228.

The sensor elements 121, 122, 221 and 222 detect the rotation angles of the motor 80. In the present embodiment, the sensor elements 121, 122, 221 and 222 are arranged at locations to face a magnet which is provided on a tip end of a shaft that rotates integrally with the rotor (not shown) of the motor 80, and are magnetism detection elements which detect magnetic field that changes with rotation of the rotor. Here, the motor 80 is connected to the steering shaft 92 via the reduction gear 89. An integrated value of the rotation angle of the motor 80 can be converted to a rotation angle of the steering shaft 92 by converting it using a gear ratio. That is, detecting a change in the rotation angle θs of the motor 80 can be understood as detecting a change in the steering angle. In the present embodiment, in order to distinguish detection values of the sensor elements, a detection value of the sensor element 121 is indicated with "1$a$" and a detection value of the sensor element 122 is indicated with "1$b$." Similarly, a detection value of the sensor element 221 is indicated with "2$a$" and a detection value of the sensor element 222 is indicated with "2$b$."

The rotation angle calculation unit 123 calculates a rotation angle θm_1$a$ of the motor 80 based on a detection signal of the sensor element 121. The rotation angle calculation unit 124 calculates a rotation angle θm_1$b$ of the motor 80 based on a detection signal of the sensor element 122. The rotation angle calculation unit 223 calculates a rotation angle θm_2$a$ of the motor 80 based on a detection signal of the sensor element 221. The rotation angle calculation unit 224 calculates a rotation angle θm_2$b$ of the motor 80 based on a detection signal of the sensor element 222. Here, the rotation angles θm_1$a$, θm_1$b$, θm_2$a$ and θm_2$b$ are mechanical angles. Any values may be used as long as they can be converted into mechanical angles.

The first turn counter 125 calculates a number of rotations TC1 of the motor 80 based on the detection signal of the sensor element 121. The second turn counter 225 calculates a number of rotations TC2 of the motor 80 based on the detection signal of the sensor element 221. The "number of rotations" referred to in the present disclosure is not a number of rotations represented by a unit rpm or the like, that is, not a rotational speed, but a value representing accumulated number of rotations of the rotor. The number of rotations TC1 and TC2 may be any values that can be converted to the number of rotations, such as a count number obtained by dividing one rotation of the rotor into a plurality of areas.

The first communication unit 128 transmits first sensor signals, which include θm_1$a$, θm_1$b$, the number of rotations TC1 and a status signal indicating an abnormality determination result of the first rotation angle sensor 120, to the first control unit 150 by, for example, digital communication such as SPI (serial peripheral interface) communication. The second communication unit 228 transmits second sensor signals, which include θm_2$a$, θm_2$b$, the number of rotations TC2 and a status signal indicating an abnormality determination result of the second rotation angle sensor 120, to the second control unit 250 by, for example, digital communication such as SPI (serial peripheral interface) communication.

Electric power is supplied to the first rotation angle sensor 120 from the first battery 170 through a first regulator 175. Thus, even in case that a start switch of the vehicle, such as an ignition switch, is in a turned-off state, the rotation angle sensor 120 can continue its operation with the power supplied from the first battery 170 through the first regulator 175. In the present embodiment, in case that the start switch is in the turned-off state, at least counting of the number of rotations TC1 by the first turn counter 125 is continued.

Electric power is supplied to the second rotation angle sensor 220 from the second battery 270 through a second regulator 275. Thus, even in case that the start switch of the vehicle, is in the turned-off state, the second rotation angle sensor 220 can continue its operation with the power supplied from the second battery 270 through the second regulator 275. In the present embodiment, in case that the start switch is in the turned-off state, at least counting of the number of rotations TC2 by the second turn counter 225 is continued.

The first control unit 150 includes a sensor communication unit 151, an inter-microcomputer communication unit 152, an external communication unit 153, a steering angle calculation unit 155, a communication control unit 157 and a motor control unit 159. The second control unit 250 includes a sensor communication unit 251, an inter-microcomputer communication unit 252, an external communication unit 253, a steering angle calculation unit 255, a communication control unit 257 and a motor control unit 259.

The first and second control units 150 and 250 are mainly composed of first and second microcomputers, respectively. Each microcomputer internally includes, although not shown, a CPU, a ROM (read-only non-transitory tangible memory device), an I/O and a bus line connecting these components. Various processing executed in the control units 150 and 250 may be software processing of a computer program stored in the tangible memory device such as ROM and executed by the CPU, or may be hardware processing executed by dedicated special electronic circuits. The first and second control units 150 and 250 are turned on to operate when the start switch is turned on, and turned off after a shutdown process and the like are finished when the start switch is turned off.

The sensor communication unit 151 acquires, from the first rotation angle sensor 120, the first sensor signal including the rotation angles $\theta m\_1a$, $\theta m\_1b$, and the number of rotations TC1. The sensor communication unit 251 acquires, from the second rotation angle sensor 220, the second sensor signal including the rotation angles $\theta m\_2a$, $\theta m\_2b$ and the number of rotations TC2.

The inter-microcomputer communication units 152 and 252 mutually transmit and receive various types of information between the first and second control units 150 and 250. Hereinafter, the communication between the first and second control units 150 and 250 is referred to as inter-microcomputer communication. As a communication method between the first and second control units 150 and 250, any method such as serial communication like SPI or SENT, CAN communication or the like may be employed.

The external communication units 153 and 253 are connected to a vehicle communication network 300 such as CAN (controller area network). As a vehicle communication network other than CAN, a network of any standard such as CAN-FD (CAN with flexible data rate) or FlexRay may be used. The external communication units 153 and 253 can transmit steering angle information related to the steering angle $\theta s$ to the external device 310 via a vehicle communication network 300. The external device 310 is a device such as an automatic driving control device or a parking assistance control device, which perform steering angle feedback control using the steering angle $\theta s$. The steering angle feedback control is used, for example, for automatic driving control, steering wheel return control or parking assist control.

The steering angle calculation unit 155 calculates a first steering angle $\theta s1$, which is a first rotation angle of the steering shaft 92, based on the rotation angles $\theta m\_1a$, $\theta m\_1b$, the number of rotations TC1, and the gear ratio of the reduction gear 89. The steering angle calculation unit 255 calculates a second steering angle $\theta s2$, which is a second rotation angle of the steering shaft 92, based on the rotation angles $\theta m\_2a$, $\theta m\_2b$, the number of rotations TC2 and the gear ratio of the reduction gear 89.

The steering angles $\theta s1$ and $\theta s2$ calculated by the steering angle calculation units 155 and 255 may be absolute steering angles or relative steering angles. The relative steering angle is a relative angle from a steering angle midpoint correction value which is a reference position. The absolute steering angle is determined based on the relative steering angle and the steering angle midpoint correction value by, for example, adding the relative steering angle and the steering angle midpoint correction value.

The steering angle information transmitted and received by the inter-microcomputer communication and the external device 310 may be the relative steering angle and the steering angle midpoint correction value or may be the absolute steering angle. The output format of the steering angle information may be different between the inter-microcomputer communication and the external transmission. For example, the steering angle information transmitted and received by the inter-microcomputer communication is the relative steering angle and the steering angle midpoint correction value, and the steering angle information transmitted and received by the external device 310 is the absolute steering angle.

When the steering angle information is used as the relative steering angle and the steering angle midpoint correction value, the steering angle midpoint correction value does not necessarily have to be transmitted every time. In case of transmitting the relative steering angle and the steering angle midpoint correction value, a receiving side knows the validity of the steering angle midpoint correction value. In addition, it is possible to properly grasp an inter-system error of the relative steering angle. On the other hand, when transmitting the absolute steering angle, communication load can be reduced since output data can be reduced. In the present embodiment, it is assumed that the absolute steering angle is transmitted. Further, first and second steering angle information related to the first and second steering angles $\theta s1$ and $\theta s2$ is simply referred to as first and second steering angles $\theta s1$ and $\theta s2$, respectively.

The communication control unit 157 controls communication with the first rotation angle sensor 120, communication with the external device 310, communication timing of the inter-microcomputer communication and the like. The communication control unit 257 controls communication with the second rotation angle sensor 220, communication with the external device 310, communication timing of the inter-microcomputer communication and the like. The motor control units 159 and 259 control driving of the motor 80 based on the first and second detection values of the first and second rotation angle sensors 120 and 220, a detection value of a current sensor (not shown) and the like.

In the present embodiment, the first and second rotation angle sensors 120 and 220 are configured to function independently. The first detection value of the first rotation angle sensor 120 is transmitted to the first control unit 150. The second detection value of the second rotation angle sensor 220 is transmitted to the second control unit 250. Further, the first steering angle $\theta s1$ calculated by the first control unit 150 based on the first detection value of the first rotation angle sensor 120 and the second steering angle $\theta s2$ calculation by the second control unit 250 based on the second detection value of the second rotation angle sensor 220 are transmitted to the external device 310, which is common to both first and second control units 150 and 250.

Here, there is a possibility that the steering angles $\theta s1$ and $\theta s2$ may become different due to a detection error of the sensor elements, a difference between detection timing or the like. In case that the information on a plurality of steering angles having an error therebetween is input to the same external device 310 that performs the steering angle feedback control, the control in the external device 310 diverges without converging or causes vibration.

Therefore, the first and second control units 150 and 250 are configured not to simultaneously transmit the steering angle information but configured such that only either one of the control units 150 and 250 transmits the steering angle information to the external device 310 at one steering angle transmission timing of a predetermined steering angle transmission period. In the present embodiment, the steering angles θs 1 and θs 2 are shared by communication between microcomputers, and one of the control units 150 and 250 transmits the average value to the external device 310 as steering angle information. In the present embodiment, the second control unit 250 is exemplified to transmit the second steering angle θs2 to the first control unit 150 by the inter-microcomputer communication. The first control unit 150 calculates an average value of the first and second steering angles θs1 and θs2 and transmits a calculated average value to the external device 310.

Prior to the description of the external communication control, abnormalities in the steering angle detection device 10 will be summarized. An abnormality of the first rotation angle sensor 120 is referred to as "an abnormality A1." An abnormality of the second rotation angle sensor 220 is referred to as "an abnormality A2." A communication abnormality between the first rotation angle sensor 120 and the first control unit 150 is referred to as "an abnormality B1." A communication abnormality between the second rotation angle sensor 220 and the second control unit 250 is referred to as "an abnormality B2." A communication abnormality between the first control unit 150 and the external device 310 is referred to as "an abnormality C1." A communication abnormality between the second control unit 250 and the external device 310 is referred to as "an abnormality C2." Further, the abnormalities A1, B1 and C1 are collectively referred to as "an abnormality of the first system L1." The abnormalities B1, B2 and C2 are collectively referred to as "an abnormality of the second system L2." Further, an inter-microcomputer abnormality between the microcomputers is referred to as "an abnormal D." An abnormality determined based on comparison of the steering angles θs1 and θs2 is referred to as "an abnormal E."

Figure 3:
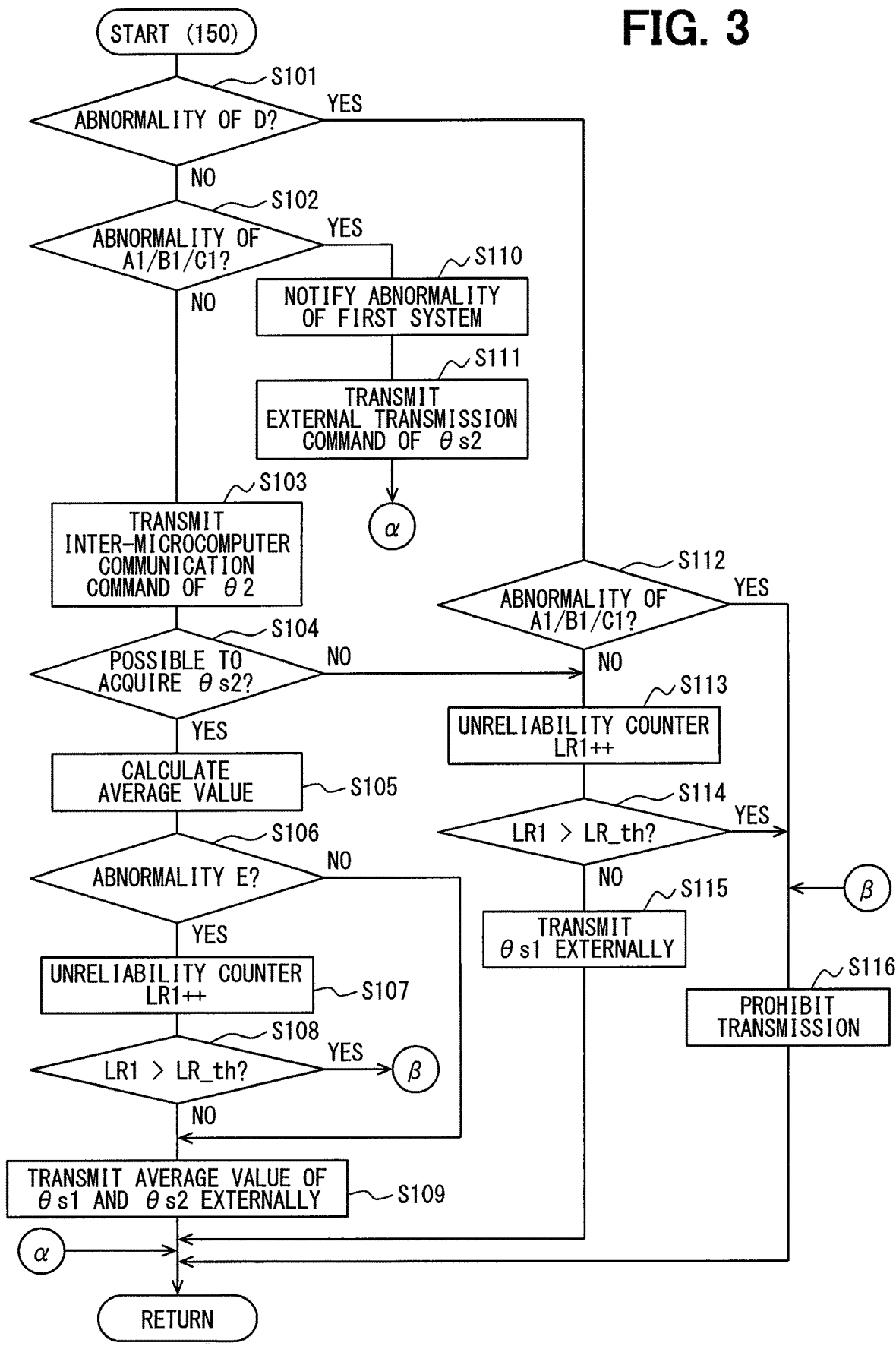
FIG. 3 is a flowchart showing external communication control processing executed by a first control unit in the first embodiment.
Figure 4:
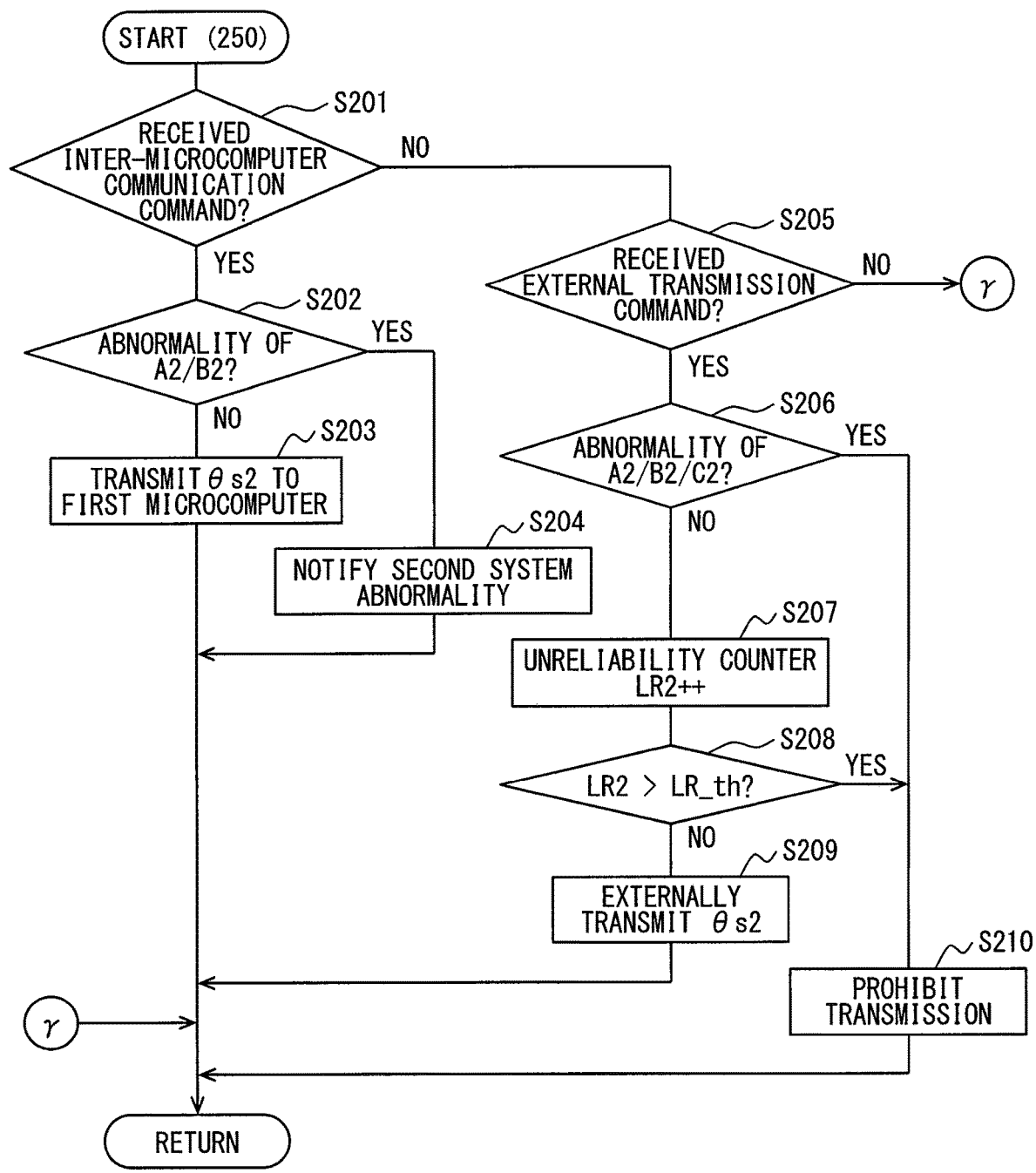
FIG. 4 is a flowchart showing external communication control processing executed by a second control unit in the first embodiment.

The external communication control processing will be described in detail with reference to flowcharts shown in FIG. 3 and FIG. 4. FIG. 3 shows control executed in the first control unit 150. FIG. 4 shows control executed in the second control unit 250. In the flowcharts, the first control unit 150 is referred to as "a first microcomputer" and the second control unit 250 is referred to as "a second microcomputer." The processing in FIG. 3 and FIG. 4 are executed at predetermined intervals in the respective control units 150 and 250. Hereinafter, each "step" in the figures is simply indicated as a symbol "S."

The processing in FIG. 3 is executed by the first control unit 150 in a cycle period corresponding to a steering angle transmission cycle. In S101 first, the communication control unit 157 checks whether the inter-microcomputer communication abnormality (abnormality D) has occurred. In case it is determined that the inter-microcomputer communication abnormality has occurred (S101: YES), S112 is executed. In case it is determined that no inter-microcomputer communication abnormality has occurred (S101: NO), S102 is executed.

In S102, the communication control unit 157 checks whether the abnormality (abnormality A1) of the first rotation angle sensor 120 that is the abnormality in the first system L1 has occurred, whether the communication abnormality (abnormality B1) in the communication between the first rotation angle sensor 120 and the first control unit 150 has occurred and whether the communication abnormality (abnormality C1) between the first control unit 150 and the external device 310 has occurred. In case it is determined that the abnormality of the first system L1 has occurred (S102: YES), S110 is executed. In case it is determined that the abnormality of the first system L1 has not occurred (S102: NO), S103 is executed.

In S103, the inter-microcomputer communication unit 152 transmits, to the second control unit 250, an inter-microcomputer communication command signal instructing transmission of the steering angle θs2 to the first control unit 150. In S104, the communication control unit 157 checks whether the steering angle θs2 could be acquired from the second control unit 250 within a reception standby period after transmitting the inter-microcomputer communication command signal. In case it is determined that the steering angle θs2 could not be acquired (S104: NO), S113 is executed. In case it is determined that the steering angle θs2 could be acquired (S104: YES), S105 is executed.

In S105, the steering angle calculation unit 155 calculates the average value of the steering angles θs1 and θs2. In S106, the communication control unit 157 performs abnormality determination by comparing the steering angles θs1 and θs2, and checks whether a binary comparison abnormality (abnormality E) has occurred. Here, when the difference between the steering angles θs1 and θs2 is larger than an abnormality determination threshold value, it is determined that the binary comparison abnormality has occurred. In case it is determined that the binary comparison abnormality has not occurred (S106: NO), S109 is executed. In case it is determined that the binary comparison abnormality has occurred (S106: YES), S107 is executed.

In S107, the communication control unit 157 increments a count value LR1 of an unreliability counter. The unreliability counter is provided as a counter which increments its count when there is a possibility (unreliability) that the steering angle information is abnormal. As the count value LR1 of the unreliability counter increases, the reliability of the steering angle information decreases.

In S108, the communication control unit 157 checks whether the count value LR1 of the unreliability counter is larger than a reliability determination threshold value LR_th. Here, it is to be understood that the reliability of the steering angle information is checked based on the count value LR1 of the unreliability counter. Specifically, in case that the count value of the unreliability counter is larger than the reliability determination threshold value, it is determined that the steering angle information is unreliable. The same check described above is also executed in S114 and S208 described later. In case it is determined that the count value LR1 is larger than the reliability determination threshold value LR_th (S108: YES), S116 is executed, and transmission of the steering angle information to the external device 310 is prohibited. In case it is determined that the count value LR1 is equal to or smaller than the reliability determination threshold value LR_th (S108: NO), S109 is executed.

In S109, the external communication unit 153 transmits the average value of the steering angles θs1 and θs2 to the external device 310 as the steering angle information. At this time, the external device 310 may transmit the count value LR1 of the unreliability counter together with the steering angle information. The count value LR1 may similarly be transmitted in other steps such as S115, S209 and the like related to the transmission of the steering angle information. By transmitting the count value of the unreliability counter to the external device 310 in addition to the steering angle information, the external device 310 side can take measures in correspondence to the reliability.

In S110 which is executed when the inter-microcomputer communication is normal (S101: NO) and it is determined that the first system L1 is abnormal (S102: YES), the inter-microcomputer communication unit 152 notifies the second control unit 250 of the abnormality of the first system L1. In S111, the inter-microcomputer communication unit 152 transmits, to the second control unit 250, an external transmission command signal instructing transmission of information related to the steering angle θs2 to the external device 310.

In S112, which is executed in case that the inter-microcomputer communication is abnormal (S101: YES), the communication control unit 157 checks whether the first system L1 has the abnormality in the similar manner as in S102. In case it is determined that the abnormality has occurred in the first system L1 (S112: YES), S116 is executed and the transmission of the steering angle information to the external device 310 is prohibited. In case it is determined that the abnormality of the first system L1 has not occurred (S112: NO), S113 is executed. In S113, the communication control unit 157 increments the count value LR1 of the unreliability counter.

In S114, the communication control unit 157 checks whether the count value LR1 of the unreliability counter is larger than the reliability determination threshold value LR_th in the similar manner as in S108. The reliability determination threshold value LR_th may be the same value or a different value between the processing in S108 and the processing in S114. The reliability determination threshold value LR_th in S208 may also be the same or different from the value used in S114. In case it is determined that the count value LR1 is larger than the reliability determination threshold value LR_th (S114: YES), S116 is executed, and the transmission of the steering angle information to the external device 310 is prohibited. In case it is determined that the count value LR1 is equal to or smaller than the reliability determination threshold value LR_th (S114: NO), S115 is executed. In S115, the external communication unit 153 transmits the information related to the steering angle θs1 to the external device 310 as the steering angle information.

FIG. 4 shows processing executed by the second control unit 250. In S201, the communication control unit 257 checks whether the inter-microcomputer command signal has been received. This command signal is transmitted from the first control unit 150 in the processing of S103 in FIG. 3 and indicates the transmission of the second steering angle θs2 to the first control unit 150. In case it is determined that the inter-microcomputer communication command signal has not been received from the first control unit 150 (S201: NO), S205 is executed. In case it is determined that the inter-microcomputer communication command signal has been received (S201: YES), S202 is executed.

In S202, the communication control unit 257 checks whether the abnormality of the second rotation angle sensor 220 (abnormality A2) or the communication abnormality between the second rotation angle sensor 220 and the second control unit 250 (abnormality B2) has occurred. In case it is determined that the abnormality A2 or the abnormality B2 has occurred (S202: YES), S204 is executed. In case it is determined that the abnormality A2 or the abnormality B2 has not occurred (S202: NO), S203 is executed.

In S203, the inter-microcomputer communication unit 252 transmits the second steering angle θs2 to the first control unit 150. In S204, the inter-microcomputer communication unit 252 transmits, to the first control unit 150, an abnormality notification indicating that the second system L2 is abnormal.

In S205 which is executed in case it is determined that the inter-microcomputer communication command signal has not been received from the first control unit (S201: NO), the communication control unit 257 checks whether the external transmission command signal has been received. The external transmission command signal is the command signal which is transmitted from the first control unit 150 in S110 of FIG. 3 and indicates the transmission of the second steering angle θs2 to the external device 310. In case it is determined that the external transmission command signal has not been received (S205: NO), the steering angle θs2 is not transmitted. In case it is detected that that the inter-microcomputer communication command and the external transmission command cannot be received and that the transmission of the steering angle θs1 from the first control unit 150 to the external device 310 has not been performed either, it may be regarded that the first control unit 150 is abnormal and cannot transmit the steering angle θs1 to the external device 310. In this case, S206 is executed. In case it is determined that the external transmission command signal has been received (S205: YES), S206 is executed.

In S206, the communication control unit 157 checks whether the abnormality of the second rotation angle sensor 220 (abnormality A2) that is the abnormality in the second system L2 has occurred, whether the communication abnormality in the communication between the second rotation angle sensor 220 and the second control unit 250 (abnormality B2) has occurred or whether the communication abnormality between the second control unit 250 and the external device 310 (abnormality C2) has occurred. In case it is determined that the abnormality has occurred in the second system L2 (S206: YES), S210 is executed and the transmission of the steering angle θs2 to the external device 310 is prohibited. In case it is determined that the abnormality of the second system L2 has not occurred (S206: NO), S207 is executed. In S207, the communication control unit 257 increments the count value LR2 of the unreliability counter.

In case it is determined that the count value LR2 is larger than the reliability determination threshold value LR_th (S208: YES), S210 is executed and the transmission of the second steering angle θs2 to the external device 310 is prohibited. In case it is determined that the count value LR2 is equal to or smaller than the reliability determination threshold value LR_th (S208: NO), S209 is executed. In S209, the external communication unit 253 transmits the second steering angle θs2 as the steering angle information to the external device 310.

In FIG. 3 and FIG. 4, the abnormality determination is made in each execution of processing. However, when the abnormality D is finalized, an affirmative determination (YES) may always be made in S101. Similarly, when the corresponding abnormality is finalized in S102, S106, S112, S202 and S206, affirmative determinations may always be made. The same processing may be made in abnormality determinations in the embodiments described later.

Here, transmitting and receiving the relative steering angle and the steering angle midpoint correction value as the steering angle information will be described further. The steering angle information to be transmitted and received may be the average value of the relative steering angles and the average value of the steering angle midpoint correction values. Further, it may be the average value of the relative steering angles and one of the steering angle midpoint correction values. The steering angle midpoint correction value does not have to be transmitted every time. For example, the steering angle midpoint correction value may be transmitted only at the first calculation operation after the start switch is turned on or at a predetermined interval.

In the present embodiment, the first rotation angle sensor 120 is provided in correspondence to the first control unit 150, and the second rotation angle sensor 220 is provided in correspondence to the second control unit 250. That is, at least two sets are provided independently and redundantly. Therefore, there arises a difference between the first steering angle θs1 calculated by the first control unit 150 and the second steering angle θs2 calculated by the second control unit 250 because of the detection error or the detection timing error between the rotation angle sensors 120 and 220. The first and second control units 150 and 250 are configured to transmit the steering angle information to the external device 310. Here, when different steering angle information is transmitted from the first and second control units 150 and 250 to the external device 310, an increase in convergence time of control and fluctuation of the steering angle may occur in case the feedback control or the like using the steering angle θs is performed by the external device 310.

Therefore, in the present embodiment, the first control unit 150 acquires the second steering angle θs2 from the second control unit 250 through the inter-microcomputer communication and outputs the average value of the first and second steering angles θs1 and θs2 as the steering angle information. As a result, since only one steering angle information is always transmitted from the steering angle detection device 10 to the external device 310 at one transmission timing, it is possible to prevent control failure in the external device 310 from occurring because of transmission of a plurality of steering angle information including an error. By using the average value of the steering angles θs1 and θs2 as the steering angle information, the average steering angle determined based on the detection values of the two rotation angle sensors 120 and 220 is transmitted to the external device 310 without performing initial correction or the like. In addition, it is possible to average output errors due to aging deterioration or temperature characteristics of the sensor elements 121, 122, 221 and 222. In the present embodiment, the second steering angle θs2 is transmitted from the second control unit 250 to the first control unit 150 by the inter-microcomputer communication. Therefore, both of the steering angles θs1 and θs2 can be used in the first control unit 150 and the steering angles θs1 and θs2 can be compared by the first control unit 150. It is thus possible to detect probability of abnormality in case the difference is larger than an abnormality determination threshold value.

As described above, the steering angle detection device 10 includes plural control units and plural rotation angle sensors. In the present embodiment, the plural control units are exemplified as first and second control units 150 and 250 and the plural rotation angle sensors are exemplified as first and second rotation angle sensors 120 and 220 which transmit first and second steering angle information related to the steering angles of the vehicle to the external device 310. In addition, the first and second control units 150 and 250 can mutually transmit and receive information. Here, the first and second control units 150 and 250 can not only transmit and receive information by the inter-microcomputer communication directly, but also transmit and receive information via the vehicle communication network 300, etc. for example. In either way, first and second the control units 150 and 250 are configured to transmit and receive information mutually.

The first and second rotation angle sensors 120 and 220 are provided in correspondence to the first and second control units 150 and 250, respectively. Specifically, the first rotation angle sensor 120 is provided for the first control unit 150, and the second rotation angle sensor 220 is provided for the second control unit 250. The rotation angle sensors 120 and 220 detect changes in the steering angles θs, and output sensor signals corresponding to the detection values to the corresponding control units 150 and 250, respectively.

The steering angle information is transmitted from a transmission control unit, which is one of the first and second control units 150 and 250, to the external device 310 at one transmission timing. In the present embodiment, the first control unit 150 operates as the transmission control unit by execution of S109 and S115 and the second control unit 250 operates as the transmission control unit by execution of S209. In the present embodiment, the steering angle information is transmitted to the external device 310 from only one transmission control unit at one transmission timing, and transmission of steering angle information is not performed from other control units. As a result, it is possible to prevent the occurrence of control problems which may otherwise be caused in the external device 310 by simultaneous transmission of a plurality of pieces of information having errors.

The first control unit 150, which is the transmission control unit, acquires the second steering angle θs2, which is the other steering angle information corresponding to the detection value of the second rotation angle sensor 220 provided in correspondence to the second control unit 250 which is the other control unit. The first control unit 150 then calculates the steering angle based on the acquired other steering angle information of the steering angle θs2 and the own steering angle information of the first steering angle θs1 corresponding to the detection value of the first rotation angle sensor 120. The first control unit 150 transmits the calculated steering angle as the steering angle information to the external device 310. In the present embodiment, the first control unit 150 acquires the second steering angle θs2 from the second control unit 250 through the inter-microcomputer communication, calculates the average steering angle and transmits the average steering angle as the steering angle information. Thereby, the average steering angle can be transmitted to the external device 310 without performing the initial correction and the like. In addition, it is possible to average output errors which may be caused due to aging deterioration or temperature characteristics of the sensor elements.

In the present embodiment, the first control unit 150 is assumed to be a master control unit, the second control unit 250 is assumed to be a slave control unit, the first system L1 is assumed to be a master system, and the second system L2 is assumed to be a slave system. The first control unit 150 is used as the transmission control unit when the first system L1 is normal, but the second control unit 250 is used as the transmission control unit when the first system L1 becomes abnormal. Thereby, even when an abnormality occurs in either part of plural systems, transmission of the steering angle information to the external device 310 can be continued.

When the second control unit 250 receives information indicating that the first system L1 which is the master system is abnormal, the second control unit 250 serves as the transmission control unit, and transmits the steering angle θs2 which is information corresponding to the detection value of the second rotation angle sensor 220 provided for the second control unit 250 is transmitted to the external device 310 as the steering angle information. Thereby, even when an abnormality occurs in a part of the first system L1, transmission of the steering angle information to the external device 310 can be continued.

The steering angle information is the absolute steering angle calculated based on the steering angle midpoint correction value, which is related to the reference position, and the relative steering angle from the reference position. By setting the steering angle information as the absolute steering angle, an amount of output data can be reduced. The steering angle information may be the steering angle midpoint correction value, which is related to the reference position, and the relative steering angle from the reference position. Thereby, the validity of the steering angle midpoint correction value can be confirmed. Further, for example, in case of calculating the average value or the like, it is possible to perform averaging for only an inter-system error of the relative steering angle.

The transmission control unit transmits, to the external device 310, the reliability information related to the reliability of the steering angle information in addition to the steering angle information. The reliability information of the present embodiment is the count values LR1 and LR2 of the unreliability counter. Thus, the external device 310 can take appropriate measures in accordance with the reliability, so that an error or the like in the steering angle feedback control in the external device 310 can be prevented. When it is determined that the steering angle information is not reliable based on the reliability information related to the reliability of the steering angle information, the transmission control unit stops transmission of the steering angle information to the external device 310. As a result, the steering angle information with low reliability is not transmitted, and errors in the steering angle feedback control in the external device 310 can be prevented.

The electric power steering device 8 includes the steering angle detection device 10, the motor 80, and the reduction gear 89 which is the power transmission unit. The motor 80 outputs the assist torque that assists the driver in steering the steering wheel 91. The reduction gear 89 transmits the driving force of the motor 80 to the steering shaft 92. The control units 150 and 250 control driving of the motor 10. Thus, the steering angle information can be appropriately transmitted from the electric power steering device 8 to the external device 310. In the present embodiments, the steering angle sensor is the rotation angle sensor 120, 220 that detects the rotation angle and the number of rotations of the motor 80. The steering angle θs is calculated based on the rotation angle θm and the number of rotations TC of the motor 80. Thereby, the number of parts can be reduced as compared with the case where a separate steering angle sensor is provided.

Second Embodiment

Figure 5:
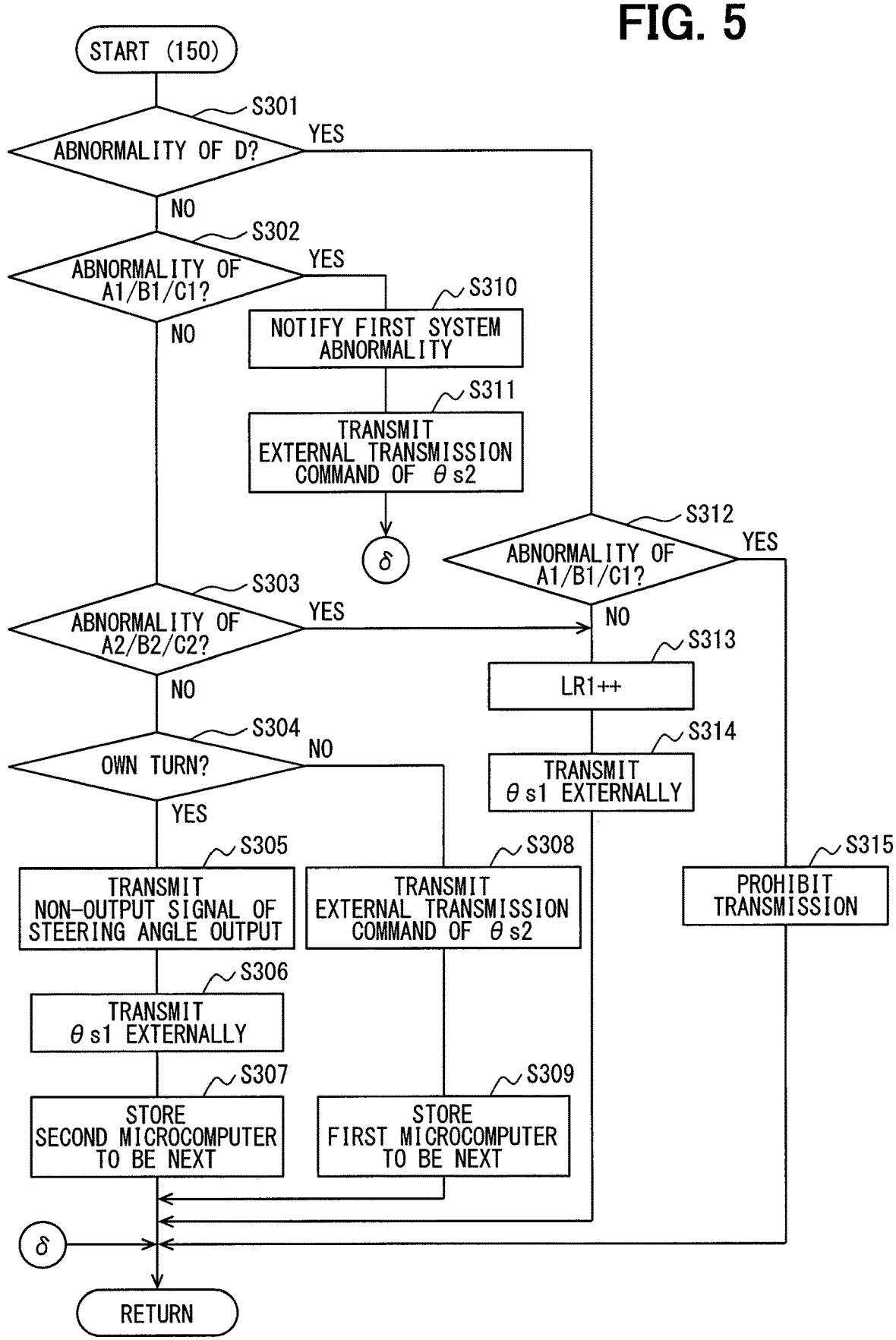
FIG. 5 is a flowchart showing external communication control processing executed by a first control unit in a second embodiment.
Figure 6:
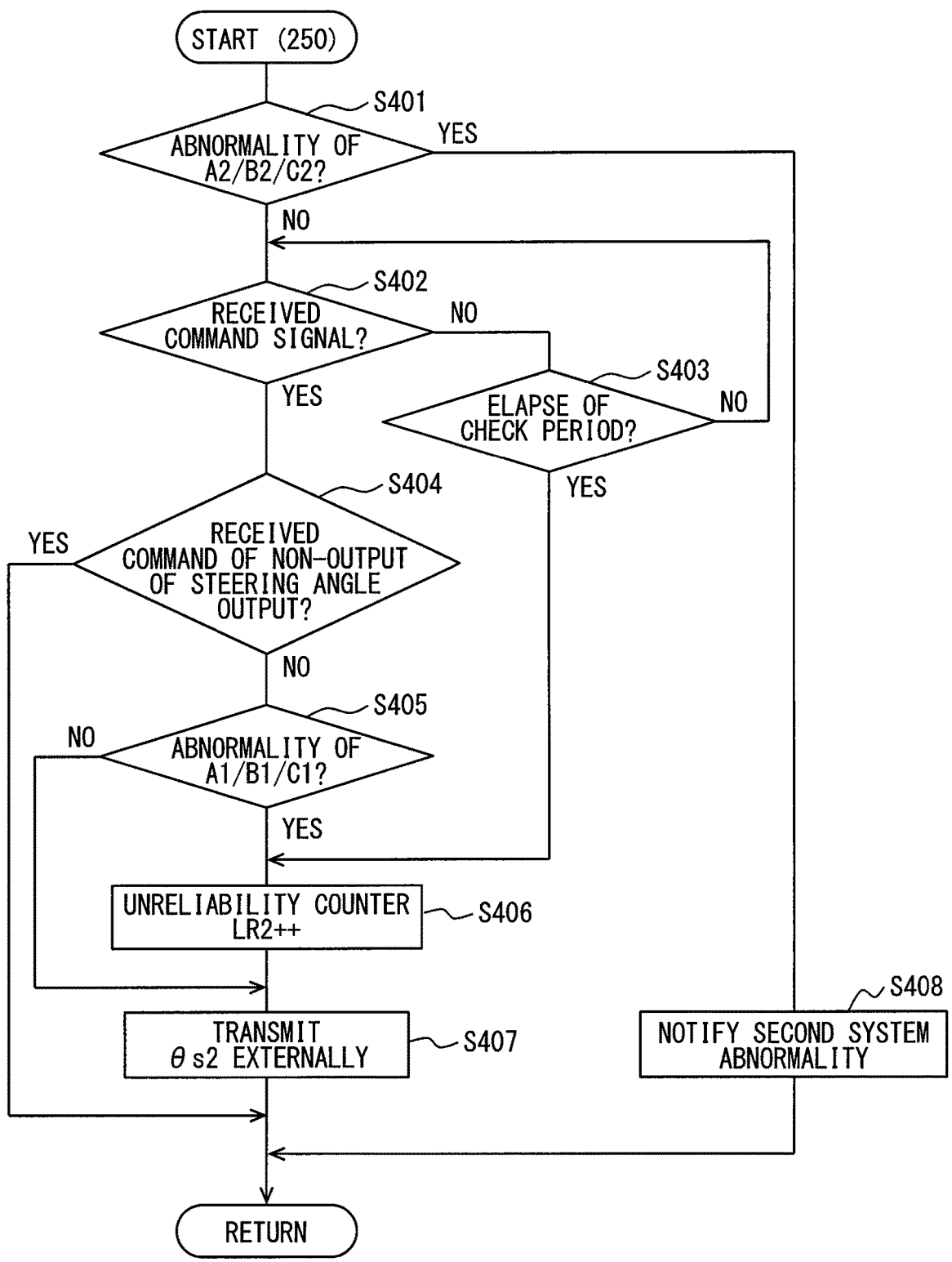
FIG. 6 is a flowchart showing external communication control processing executed by a second control unit in the second embodiment.

A second embodiment is shown in FIG. 5 and FIG. 6. In second to fourth embodiments described below, the external communication control processing are different. Only these differences will be mainly described thereby to simplify the description.

In the second embodiment, one of a plurality of control units is referred to as a master control unit and control units other than the master control unit are referred to as slave control units. Each slave control unit controls transmission of steering angle information based on a steering angle transmission command or steering angle non-request output from the master control unit. By switching the transmission and non-transmission of the steering angle information from the slave control unit in response to a command from the master control unit, it is possible to prevent the steering angle information from being transmitted at the same time from a plurality of control units. In the following description, the first control unit 150 is assumed to be the master control unit and the second control unit 250 is assumed to be the slave control unit.

The external communication control processing will be described in detail with reference to flowcharts shown in FIG. 5 and FIG. 6. FIG. 5 shows control in the first control unit 150 which is the master control unit. FIG. 6 shows control in the second control unit 250 which is the slave control unit. In the present embodiment, the first and second control units 150 and 250 are exemplified to alternately output the steering angle information.

The processing of FIG. 5 is executed by the first control unit 150. The processing of S301 and S302 are the same as the processing of S101 and S102 in FIG. 3. In case it is determined that the inter-microcomputer communication abnormality (abnormality D) has occurred (S301: YES), S312 is executed. In case it is determined that no inter-microcomputer communication abnormality has occurred (S301: NO), S302 is executed. In case it is determined that the abnormality of the first system L1 has occurred (S302: YES), S310 is executed. In case it is determined that the abnormality of the first system L1 has not occurred (S302: NO), S303 is executed.

In S303, the communication control unit 157 checks whether the abnormality of the second system L2 has occurred. Here, when the abnormality notification transmitted from the second control unit 250 by the inter-microcomputer communication is received in S408 described later, it is determined that the abnormality of the second system L2 has occurred. In case it is determined that the abnormality of the second system L2 has occurred (S303: YES), S313 is executed. In case it is determined that the abnormality of the second system L2 has not occurred (S303: NO), S304 is executed.

In S304, the communication control unit 157 checks whether the current output timing is its own turn. In case it is determined that the current output timing is not the own turn (S304: NO), S308 is executed. In case it is determined that the current output timing is the own turn (S304: YES), S305 is executed. In S305, the inter-microcomputer communication unit 152 transmits, to the second control unit 250, a steering angle non-request signal instructing that the transmission of the steering angle θs2 to the external device 310 is not necessary. In S306, the external communication unit 153 transmits the steering angle θs1 as the steering angle information to the external device 310. In S307, the communication control unit 157 stores in the storage unit (not shown) information such as a flag indicating that it is a turn of the second control unit 250 at the next output timing.

In step S308, which the inter-microcomputer communication unit 152 executes when the current output timing is not the own turn (S304: NO), the inter-microcomputer communication unit 152 transmits to the second control unit 250 the external transmission command signal for instructing external transmission of the steering angle θs2. In S309, the communication control unit 157 stores in the storage unit (not shown) the information such as a flag indicating that it is a turn of the second control unit 250 at the next output timing.

The processing S310 executed in case that the inter-microcomputer communication is normal (S301: YES) and the first system L1 has the abnormality (S302: YES), is the same as the processing in S110 shown in FIG. 3. The processing of S311 to S313 is similar to the processing S111 to S113 and the processing of S314 and S315 are similar to the processing of S115 and S116.

FIG. 6 shows processing executed by the second control unit 250. In S401, the communication control unit 257 checks whether the abnormality of the second system L2 has occurred. In case it is determined that the abnormality of the second system L2 has occurred (S401: YES), S408 is executed. The inter-microcomputer communication unit 252 transmits to the first control unit 150 the abnormality notification indicating that the abnormality of the second system L2 has occurred. In case it is determined that the abnormality of the second system L2 has not occurred (S401: NO), S402 is executed.

In S402, the communication control unit 257 checks whether a command signal has been received from the first control unit 150. The command signal is the steering angle non-output signal or the external transmission command signal. In case it is determined that the command signal has not been received from the first control unit 150 (S402: NO), S403 is executed. In case it is determined that the command signal has been received from the first control unit 150 (S402: YES), S404 is executed.

In S403, the communication control unit 257 checks whether a predetermined check period has elapsed after the previous command signal was received. The check period is set to be longer than a steering angle transmission cycle period. In case it is determined that the check period has not elapsed after receiving of the previous command signal (S403: NO), S402 is executed. In case it is determined that the check period has elapsed after receiving of the previous command signal (S403: YES), S406 is executed.

In S404, the communication control unit 257 checks whether the received command signal is the steering angle non-output signal. In case it is determined that the received command signal is the steering angle non-output signal (S404: YES), the processing of S405 and subsequent steps are not executed and the steering angle θs2 is not transmitted to the external device 310. In case it is determined that the received command signal is not the steering angle non-output signal (S404: NO), that is, the received command signal is the external transmission command signal, S405 is executed.

In S405, the communication control unit 257 checks whether the abnormality of the first system L1 has occurred. Here, when the abnormality notification transmitted from the first control unit 150 by the inter-microcomputer communication is received in S310, it is determined that the abnormality of the first system L1 has occurred. In case it is determined that the abnormality of the first system L1 has not occurred (S405: NO), S407 is executed. In case it is determined that the abnormality of the first system L1 has occurred (S405: YES), S406 is executed. In 4207, the communication control unit 257 increments the count value LR2 of the unreliability counter. In S407, the external communication unit 253 transmits the information related to the steering angle θs2 to the external device 310 as the steering angle information.

In the present embodiment, when the first control unit 150 which is the master control unit externally transmits the steering angle θs1, the first control unit 150 transmits the steering angle non-output signal to the second control unit 250 which is the slave control unit. When the second control unit 250 need to externally transmit the steering angle θs2, the first control unit 150 transmits the external transmission command signal to the second control unit 250. That is, the command transmitted from the first control unit 150 to the second control unit 250 instructs the second control unit 250 to transmit or not transmit the steering angle θs2 externally. Since contents of this communication is simple, communication load of the inter-microcomputer communication is low.

In the present embodiment, one of the plural control units 150 and 250 is set as the transmission control unit based on the command from the first control unit 150 which is the master control unit. In the present embodiment, the first control unit 150 and the second control unit 250 are alternately set to operate as the transmission control unit based on the command from the first control unit 150. In the present embodiment, the first control unit 150 operates as the transmission control unit in executing S306 and S314 and the second control unit 250 operates as the transmission control unit in executing S407. As a result, since the steering angle information is transmitted from only one transmission control unit to the external device 310 at one transmission timing, it is possible to prevent control failure in the external device 310 from occurring because of transmission of a plurality of steering angle information including an error.

When the second control unit 250 does not receive the command from the first control unit 150 for more than the predetermined check period, the second control unit 250 is switched to operate as the transmission control unit and the information corresponding to the detection value of the second rotation angle sensor 220 provided in correspondence to the second control unit 250 is transmitted to the external device 310 as the steering angle information. Thereby, even when the abnormality occurs in transmission of the command from the first control unit 150, it is possible to continue the transmission of the steering angle information to the external device 310. The present embodiment also provides the same advantages as the above embodiment.

Third Embodiment

Figure 7:
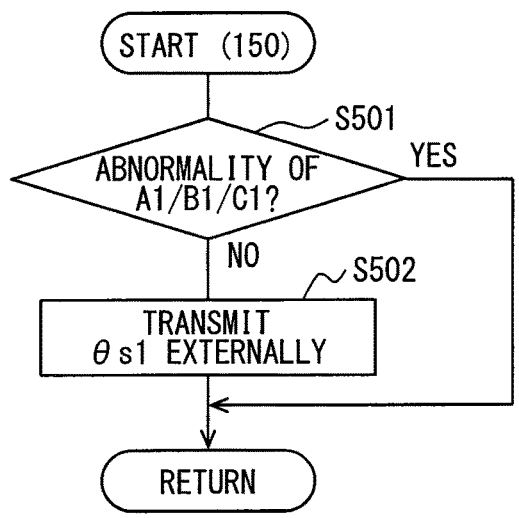
FIG. 7 is a flowchart showing external communication control processing executed by a first control unit in a third embodiment.
Figure 8:
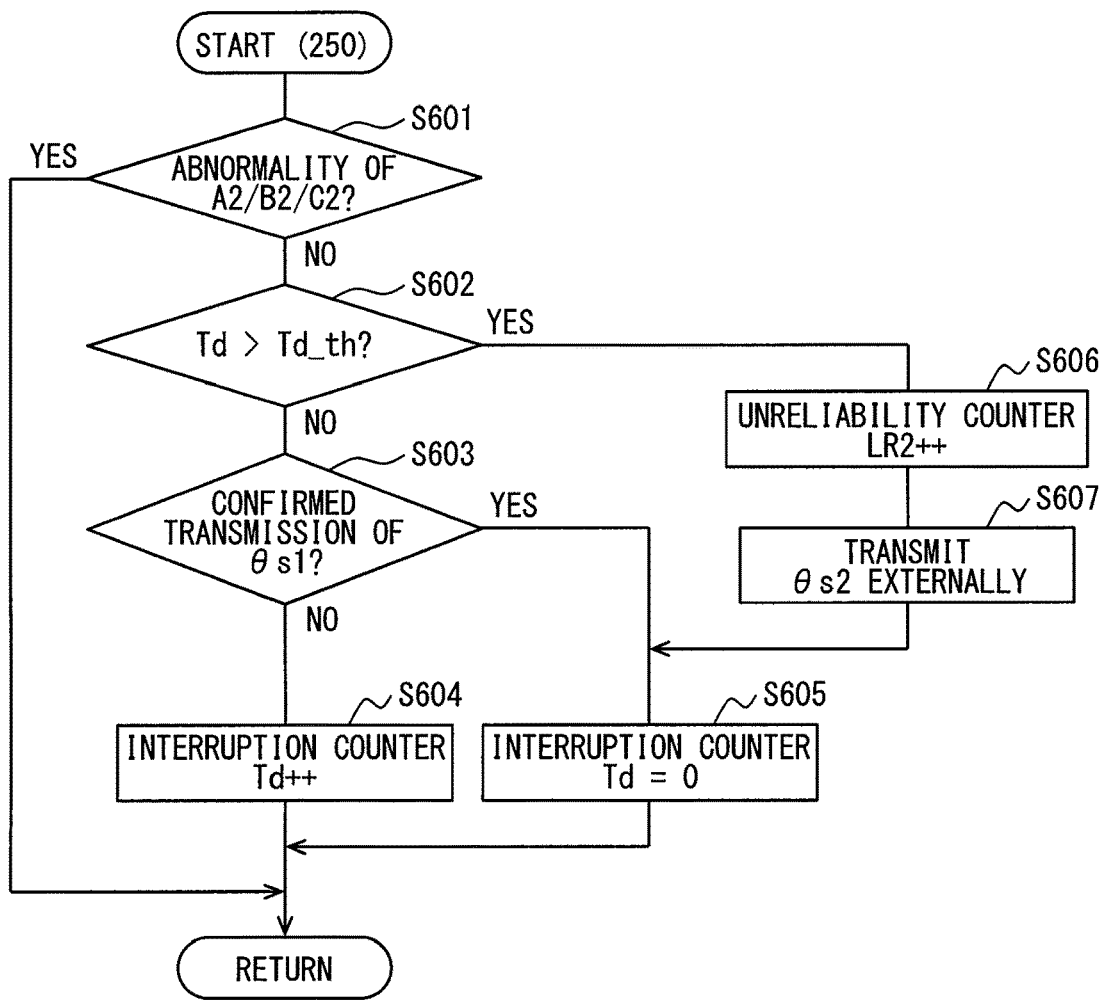
FIG. 8 is a flowchart showing external communication control processing executed by a second control unit in the third embodiment.

A third embodiment is shown in FIG. 7 and FIG. 8. In the present embodiment, the master control unit transmits the steering angle information when the master control unit is normal. Further, the slave control unit transmits the steering angle information instead of the master control unit when the abnormality occurs in the master control unit. In the following description, the first control unit 150 is assumed to be the master control unit and the second control unit 250 is assumed to be the slave control unit.

The external communication control processing will be described in detail with reference to flowcharts shown in FIG. 7 and FIG. 8. FIG. 7 shows control in the first control unit 150 which is the master control unit. FIG. 8 shows control in the second control unit 250 which is the slave control unit.

The processing of S501 in FIG. 5 is the same as S102 in FIG. 3. In case it is determined that the abnormality of the first system L1 has occurred (S501: YES), S502 is not executed and the steering angle information is not transmitted externally from the external communication unit 153. In case it is determined that the abnormality of the first system L1 has not occurred (S501: NO), S502 is executed. In S502, the external communication unit 153 transmits the steering angle θs1 as the steering angle information to the external device 310.

Referring next to FIG. 8 showing the processing executed by the second control unit 250, the communication control unit 257 determines in the similar manner as in S401 of FIG. 6 whether the abnormality in the second system L2 has occurred. In case it is determined that the abnormality of the second system L2 has occurred (S601: YES), processing related to the external transmission of S602 and subsequent steps are not executed. In case it is determined that the abnormality of the second system L2 has not occurred (S601: NO), S602 is executed.

In S602, the communication control unit 257 checks whether a count value Td of the interruption counter is larger than an interruption determination threshold value Td_th. The interruption counter is provided to count time after the steering angle θs1 is transmitted to the vehicle communication network 300. The interruption determination threshold value Td_th is set to a value corresponding to a period longer than the steering angle transmission cycle period. When it is determined that the count value Td of the interruption counter is larger than the interruption determination threshold value Td_th (S602: YES), S606 is executed. In case it is determined that the count value Td of the interruption counter is larger than the interruption determination threshold value Td_th (S602: NO), S603 is executed.

In S603, the communication control unit 257 checks whether the transmission of the steering angle information, which is related to the steering angle θs1 and transmitted from the first control unit 150 to the vehicle communication network 300 has been confirmed. In case it is determined that the transmission of the steering angle θs1 is not confirmed (S603: NO), S604 is executed, and the count value Td of the interruption counter is incremented. In case it is determined that the transmission of the steering angle θs1 is confirmed (S603: YES), S605 is executed, and the count value Td of the interruption counter is reset.

The processing of S606 and S607, which are executed when the count value Td of the interruption counter is determined to be larger than the interruption determination threshold value Td_th (S602: YES) are similar to the processing of S406 and S407 in FIG. 6. The count value LR2 of the unreliability counter is incremented, and the steering angle θs2 is transmitted as the steering angle information to the external device 310 via the vehicle communication network 300.

In the present embodiment, the master control unit is determined in advance. As long as the first control unit 150 which is the master control unit is normal, the first control unit 150 transmits the steering angle information externally. The second control unit 250 which is the slave control unit does not transmit the steering angle information externally. Further, the second control unit 250 monitors whether the steering angle information from the first control unit 150 has been transmitted to the vehicle communication network 300. In case that the transmission of the steering angle information from the first control unit 150 has not been confirmed, the second control unit 250 transmits the steering angle information instead of the first control unit 150. This makes it possible to simplify operation processing related to the external communication control. In addition, there is no need to add transmission/reception of additional information for external communication control in the inter-microcomputer communication between the microcomputers. Therefore, it is not necessary to change the external communication control even when abnormality occurs in the inter-microcomputer communication.

In the present embodiment, when the steering angle information from the first control unit 150 is not transmitted continually for the interruption determination threshold value, it is determined that the first system L1 is abnormal. In this case, the second control unit 250 is switched to operate as the transmission control unit and transmit the information corresponding to the detection value of the second rotation angle sensor 220 provided corresponding to the second control unit 250 is transmitted to the external device 310 as the steering angle information. As a result, the second control unit 250 can detect the abnormality in the first system L1 without transmitting and receiving additional information in the inter-microcomputer communication. In addition, by transmitting the steering angle information from the second control unit 250 to the external device 310 at the time of abnormality of the first system L1, it is possible to continually transmit the steering angle information to the external device 310 even if the abnormality occurs in the first system L1. The present embodiment also provides the same advantages as those of the above embodiments.

Fourth Embodiment

Figure 9:
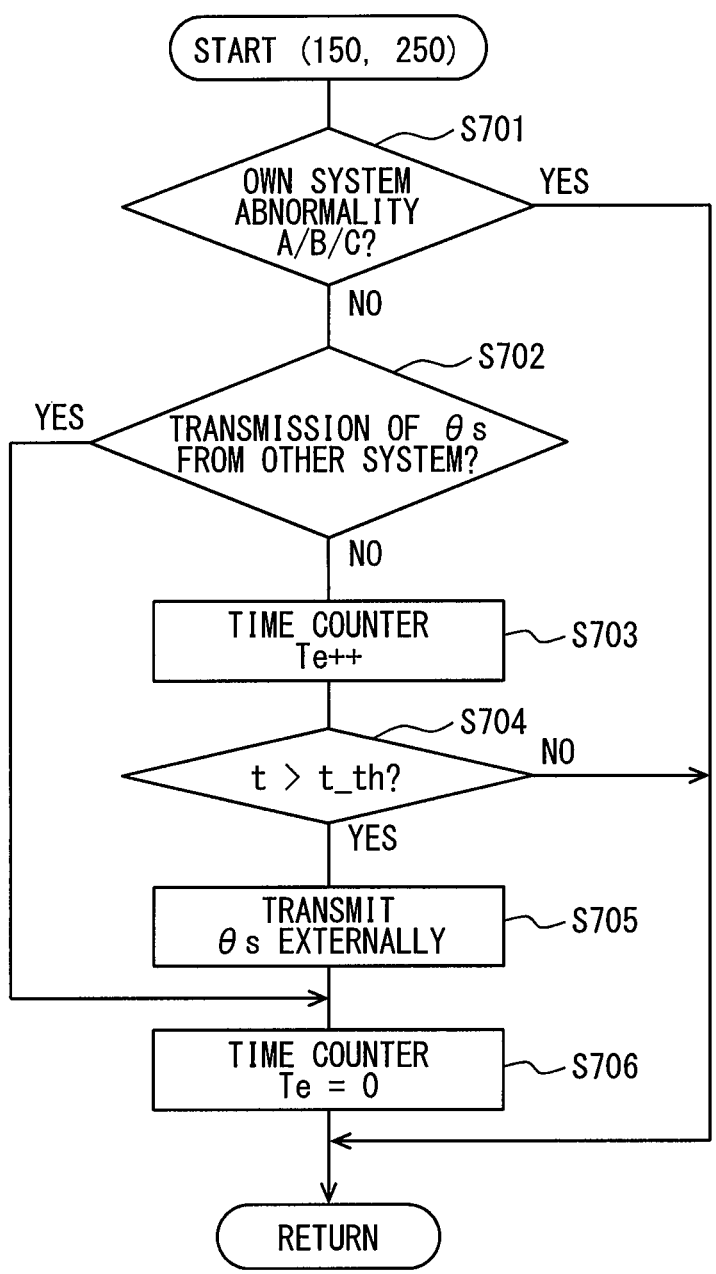
FIG. 9 is a flowchart showing external communication control processing executed in a fourth embodiment.

A fourth embodiment is shown in FIG. 9. In the present embodiment, the first and second control units 150 and 250 transmit the steering angle information when a predetermined period t_th or more elapses after the steering angle information is transmitted to the vehicle communication network 300. The first and second control units 150 and 250 are both connected to the vehicle communication network 300 and hence it is possible to detect that the steering angle information has been transmitted from the other control unit.

External communication processing in the present embodiment will be described with reference to a flowchart of FIG. 7. The processing shown in FIG. 7 is executed by each of the first and second control units 150 and 250. Here, the processing executed by the first control unit 130 will be described as a representative example. The control in the second control unit 250 is similar to the control in the first control unit 150 if the abnormality of the own system is replaced with A2, B2, C2 and the other system is replaced with the first system L1. Therefore, the description of the second control unit 250 will be simplified.

In S701, the communication control unit 157 checks whether the abnormality of the first rotation angle sensor 120 of the own system (abnormality A1) that is the abnormality in the own system has occurred, whether the communication abnormality in the communication between the first control unit (abnormality B1) has occurred or whether the communication abnormality between the first control unit 150 and the external device 310 (abnormality C2) has occurred. In case it is determined that the abnormality of the own system has occurred (S701: YES), processing related to the external transmission of S702 and subsequent steps are not executed. In case it is determined that the abnormality of the own system has not occurred (S701: NO), S702 is executed.

In S702, the communication control unit 157 checks whether the steering angle information has been transmitted from the other system to the vehicle communication network 300 after resetting of a time counter. In case it is determined that the steering angle information has been transmitted from the other system (S702: YES), S706 is executed without transmitting the steering angle θs1. In case it is determined that the abnormality of the second system L2 has not occurred (S601: NO), S602 is executed.

In S703, the communication control unit 157 increments a count value Te of the time counter that counts elapsed period. In S704, the communication control unit 157 checks whether the elapsed period t is longer than a predetermined period t_th. In case it is determined that the elapsed period t is equal to or shorter than the predetermined period t_th (S704: NO), the processing of S705 and S706 are not executed, and the steering angle information is not transmitted externally. In case it is determined that the elapsed period t is longer than the predetermined period t_th (S702: YES), S705 is executed. In S705, the external communication unit 153 transmits the steering angle θs1 to the external device 310 via the vehicle communication network 300. In S706, the count value Te of the time counter for counting the elapsed period t is reset.

In the present embodiment, each of the control units 150 and 250 measures the elapsed period t after the steering angle information is transmitted to the vehicle communication network 300. When the elapsed period t becomes equal to or longer than the predetermined period t_th, the steering angle information is transmitted to the external device 310 by either one of the control units which measured the predetermined period t_th first. This makes it possible to simplify operation processing related to the external communication control. In addition, there is no need to add transmission/reception of additional information for external communication control in the inter-microcomputer communication between the microcomputers. Therefore, it is not necessary to change the external communication control even when an abnormality occurs in the inter-microcomputer communication.

In the present embodiment, the plural control units 150 and 250 have the time counters that count the elapsed periods t after detecting that the steering angle information has been transmitted from the control units 150 and 250 to the external device 310, respectively. Each of the control units 150 and 250 transmits the information corresponding to the detection value of the rotation angle sensors 120 and 220 for the own control as the steering information to the external device 310, when the next steering angle information has not been transmitted from the other control unit and the elapsed period t becomes equal to or longer than the predetermined period t_th. In addition, each control unit 150, 250 resets the time counter upon detecting that the next steering angle information has been transmitted from the other control unit before the elapsed period t becomes the predetermined period t_th. This eliminates the need for transmission/reception of additional information related to the external communication control in the inter-microcomputer communication. For this reason, the steering angle information can be transmitted to the external device 310 from either one of the transmission control units at one transmission timing without increasing the inter-microcomputer communication load. In the present embodiment, the time counter corresponds to a timer.

The present embodiment also provides the same advantages as those of the above embodiments.

Other Embodiments (A) External Communication Control

In the first and second embodiments, the unreliability counter increments its count when any abnormality occurs actually or with high probability. In the first embodiment, in case the count value of the unreliability counter is larger than the predetermined reliability determination threshold value, the output of the steering angle information is stopped. In the second embodiment as well, in case the count value of the unreliability counter is larger than the predetermined reliability determination threshold value, the output of the steering angle information is stopped. In the first embodiment, S108, S114 or S208 may be omitted, and the steering angle information may be transmitted to the external device regardless of the count value of the unreliability counter. Also, a part or all of the count processing of the unreliability counter may be omitted.

The reliability information in the above embodiments is the count value of the unreliability counter, which increases as the reliability decreases. Also, the unreliability counter is incremented when any of the abnormalities A to E occurs. In another embodiment, the reliability information may be information other than the count value of the unreliability counter. For example, the value may be smaller as the reliability is lower. In addition, the unreliability information may include, for example, information related to an abnormality other than the abnormalities A to E, such as missing of the steering angle midpoint correction value which may be caused as a result of power supply failure from the battery.

In the first embodiment, the average value is transmitted to the external device as the calculated value based on the steering angle information. In another embodiment, the calculated value based on the steering angle information is not limited to the average value but may be any calculated value. In the embodiments other than the first embodiment, the steering angle based on the detection value of each steering angle sensor may be shared by the inter-microcomputer communication or the like, and the calculated value may be transmitted to the external device. In the second embodiment, when both control units are normal, the steering angle information of each control unit is alternately transmitted. In another embodiment, the number of times of transmission of the steering angle information from each control unit can be set arbitrarily.

(B) Control Unit

In the above embodiments, two control units are provided. In another embodiments, the number of the control units may be three or more. In case the number of control units is three or more and the master control unit and the slave control unit are set, the number of the slave control units is plural. There is only one slave control unit in the second embodiment. If there are plural slave control units, the master control unit outputs the external transmission command signal to one slave control unit in charge of transmitting the steering angle information at each current output timing. In this case, the control unit may transmit the steering angle non-output signal to the other slave control units. Further, when the abnormality occurs in the master control unit, the control unit which should operate as the transmission control unit may be selected arbitrarily from among the slave control units. For example, the slave control unit may be selected as the transmission control unit in response to the command from the master control unit. For another example, different priorities may be assigned to the slave control units in advance and one slave control unit may be selected to operate as the transmission control unit based on the pre-assigned priority.

(C) Steering Angle Sensor

In the above embodiments, one rotation angle sensor is provided for each control unit. In another embodiment, plural rotation angle sensors may be provided for each control unit. Further, in the above embodiments, the rotation angle sensor is provided with two sensor elements, two rotation angle calculation units and one rotation number calculation unit. In another embodiment, the number of sensor elements, the rotation angle calculation units and the rotation number calculation units may be one or more. In the above embodiments, the steering angle sensor is the rotation angle sensor that detects the rotation angle of the motor connected to the steering shaft via the reduction gear. In another embodiment, the steering angle sensor may be a sensor that detects the rotational state of any gear stage that is mechanically connected to the steering shaft. The steering angle information may also be information corresponding to values at any gear stage, such as a steering angle, a pinion angle, a tire angle, and an integrated value of a motor rotation angle.

(D) Steering Angle Detection Device

In the above embodiments, the steering angle detection device is applied to the electric power steering apparatus. In another embodiment, the steering angle detection device may be applied to any other devices different from the electric power steering device. The present disclosure is not limited to the embodiments described above but various modifications may be made within the scope of the present disclosure.

That is, this disclosure also encompasses various modifications and variations within the scope of equivalents. Furthermore, various combination and formation, and other combination and formation including one, more than one or less than one element may be made in the present disclosure.

What is claimed is:

1. A steering angle detection device comprising:
   at least first and second control units, each of which is configured to transmit steering angle information related to a steering angle of a vehicle to an external device and transmit and receive information mutually therebetween; and
   at least first and second steering angle sensors provided in correspondence to the first and second control units and configured to output first and second sensor signals corresponding to first and second detection values of the steering angles to the first and second control units, respectively,
   wherein one of the first and second control units is configured to transmit, as a transmission control unit, the steering angle information to the external device at one transmission timing of a steering angle transmission period,
   wherein:
      each of the first and second control units includes a timer for measuring an elapsed period from detection of transmission of the steering angle information to the external device from any one of the first and second control units;
      the second control unit is configured to transmit the second steering angle information to the external device when the first steering angle information has not been transmitted from the first control unit for the elapsed period longer than a predetermined period; and
      the second control unit is configured to reset the timer when the steering angle information has been transmitted from the first control unit to the external device before the elapsed period reaches the predetermined period, and
   wherein the first and second control units are configured to control a driving of a motor of a power steering device.

2. The steering angle detection device according to claim 1, wherein:
   the first control unit is configured to acquire second steering angle information corresponding to the second detection value of the second steering angle sensor, and transmit, as the steering angle information, a calculation value calculated based on first steering angle information, which corresponds to the first detection value of the first steering angle sensor, and the second steering angle information.

3. The steering angle detection device according to claim 1, wherein:
   the first control unit and the second control unit are configured as a master control unit and a slave control unit, respectively;
   the first control unit and the first steering angle sensor are configured to form a master system;
   second control unit and the second steering angle sensor are configured to form a slave system;
   the master control unit is configured to operate as the transmission control unit when the master system is normal; and
   the slave control unit is configured to operate as the transmission control unit when the master system is abnormal.

4. The steering angle detection device according to claim 3, wherein:
   the slave control unit is configured to operate as the transmission control unit to transmit the second steering angle information to the external device, when the slave control unit receives information indicating that the master system is abnormal.

5. The steering angle detection device according to claim 3, wherein:
   the slave control unit is configured to operate as the transmission control unit to transmit the second steering angle information to the external device, when the slave control unit does not receive the steering angle information from the master control unit for more than a predetermined interruption period.

6. The steering angle detection device according to claim 1, further comprising:
   a third control unit and a third steering angle sensor provided in correspondence to each other, wherein:
      the first control unit is configured as a master control unit;
      the second control unit and the third control unit are configured as slave control units;
      the first control unit and the first steering angle sensor are configured to form a master system;
      the second control unit and the second steering angle sensor are configured as one slave system;
      the third control unit and the third steering angle sensor are configured as another slave system; and
      the master control unit is configured to generate a command, which sets either one of the slave control units to be the transmission control unit.

7. The steering angle detection device according to claim 6, wherein:
   the second control unit is configured to operate as the transmission control unit to transmit the steering information corresponding to the second detection value of the second steering angle sensor to the external device, when the command from the master control unit is not received for a predetermined period by the slave control units.

8. The steering angle detection device according to claim 1, wherein:
   each of the first and second steering angle information indicates a steering angle midpoint correction value related to a reference position and a relative angle from the reference position.

9. The steering angle detection device according to claim 1, wherein:
the steering angle information is a steering angle midpoint correction value related to a reference position and an absolute steering angle calculated based on a relative steering angle from the reference position.

10. The steering angle detection device according to claim 1, wherein:
the transmission control unit is configured to transmit to the external device reliability information, which is related to reliability of the steering angle information and corresponds to a count value of an unreliability counter, in addition to the steering angle information, when the steering angle information is determined to have an abnormality or have a possibility of abnormality.

11. The steering angle detection device according to claim 1, wherein:
the transmission control unit is configured to stop transmission of the steering angle information to the external device, when the steering angle information is determined to be abnormal or determined to be unreliable based on reliability information corresponding to a count value, which is counted by an unreliability counter when the steering angle information is determined to have a possibility of abnormality.

12. A power steering device comprising:
a steering angle detection device comprising:
at least first and second control units, each of which is configured to transmit steering angle information related to a steering angle of a vehicle to an external device and transmit and receive information mutually therebetween; and
at least first and second steering angle sensors provided in correspondence to the first and second control units and configured to output first and second sensor signals corresponding to first and second detection values of the steering angles to the first and second control units, respectively,
wherein one of the first and second control units is configured to transmit, as a transmission control unit, the steering angle information to the external device at one transmission timing of a steering angle transmission period;
a motor generating an assist torque for assisting a steering operation on a steering member; and
a power transfer mechanism configured to transfer driving force of the motor to a driving target,
wherein the first and second control units are configured to control driving of the motor.

13. The power steering device according to claim 12, wherein:
the steering angle sensor is a rotation angle sensor for detection a rotation angle and a number of rotations of the motor; and
the steering angle is calculated based on the rotation angle and the number of rotations.

14. A steering angle detection device comprising:
at least first and second steering angle sensors configured to output first and second sensor signals corresponding to first and second detection values of a steering angle of a vehicle, respectively;
at least first and second control units including first and second microcomputers programmed to transmit steering angle information related to the steering angle of the vehicle to an external device by execution of programs stored in memories, respectively, the first and second microcomputers further programmed to transmit and receive information mutually therebetween,
wherein one of the first microcomputer and the second microcomputer is programmed to transmit, as a transmission control unit, the steering angle information to the external device at one transmission timing of a steering angle transmission period,
wherein each of the first and second microcomputers is programmed to transmit to the external device reliability information, which is related to reliability of the steering angle information and corresponds to a count value of an unreliability counter, in addition to the steering angle information, when the steering angle information is determined to have an abnormality or have a possibility of abnormality, and
wherein the first and second control units are configured to control a driving of a motor of a power steering device.

15. The steering angle detection device according to claim 14, wherein:
the first microcomputer is programmed to acquire second steering angle information corresponding to the second detection value of the second steering angle sensor, and transmit, as the steering angle information, a calculation value calculated based on first steering angle information, which corresponds to the first detection value of the first steering angle sensor, and the second steering angle information.

16. The steering angle detection device according to claim 14, wherein:
each of the first and second microcomputers includes a timer for measuring an elapsed period from detection of transmission of the steering angle information to the external device from any one of the first and second microcomputers;
the second microcomputer is programmed to transmit the second steering angle information to the external device when the first steering angle information has not been transmitted from the first microcomputer for an elapsed period longer than a predetermined period; and
the second microcomputer is programmed to reset the timer when the steering angle information has been transmitted from the first microcomputer to the external device before the elapsed period reaches the predetermined period.

17. The steering angle detection device according to claim 14, wherein:
each of the first and second microcomputers is programmed to stop transmission of the steering angle information to the external device, when the steering angle information is determined to be abnormal or determined to be unreliable based on reliability information corresponding to a count value counted by an unreliability counter when the steering angle information is determined to have a possibility of abnormality.

18. The steering angle detection device according to claim 14, wherein:
each of the first and second microcomputers is programmed to determine reliability of the steering angle information by comparing the first and second detection values; and
each of the first and second microcomputers is programmed to use a determination result of the reliability in transmitting the steering angle information to the external device.

* * * * *